(12) United States Patent
Brewka et al.

(10) Patent No.: US 8,033,385 B2
(45) Date of Patent: Oct. 11, 2011

(54) STEEP ANGLE PIPE CONVEYOR

(75) Inventors: Christof Brewka, Greenwood Village, CO (US); Ingolf Neubecker, Greenwood Village, CO (US)

(73) Assignee: ThyssenKrupp Foerdertechnik GmbH (DE)

( * ) Notice: Subject to any disclaimer, the term of this patent is extended or adjusted under 35 U.S.C. 154(b) by 430 days.

(21) Appl. No.: 12/120,709

(22) Filed: May 15, 2008

(65) Prior Publication Data
US 2008/0283368 A1  Nov. 20, 2008

(51) Int. Cl.
*B65G 15/08* (2006.01)
(52) U.S. Cl. .......................... 198/819; 198/827; 198/830
(58) Field of Classification Search .................. None
See application file for complete search history.

(56) References Cited

U.S. PATENT DOCUMENTS

| | | |
|---|---|---|
| 3,019,885 A | 2/1962 | Cushman |
| 3,338,383 A | 8/1967 | Hashimoto |
| 4,723,653 A | 2/1988 | Engst |
| 5,080,221 A | 1/1992 | Steinkotter |
| 5,150,783 A * | 9/1992 | Hashimoto .................. 198/819 |
| 5,161,675 A * | 11/1992 | Engst et al. .................. 198/819 |
| 5,232,084 A | 8/1993 | Simonsen et al. |
| 5,836,440 A * | 11/1998 | Mindich ...................... 198/819 |
| 6,308,824 B1 * | 10/2001 | Hinterholzer et al. ........ 198/819 |

FOREIGN PATENT DOCUMENTS

| | | |
|---|---|---|
| DE | 31 45 899 A1 | 10/1982 |
| DE | 36 20 906 A1 | 1/1987 |
| DE | 36 24 122 A1 | 1/1988 |
| DE | WO 88/09759 | 12/1988 |
| DE | 196 17 089 A1 | 10/1997 |
| EP | 0 194 509 A1 | 9/1986 |
| EP | 0 253 148 A1 | 1/1988 |

OTHER PUBLICATIONS

U.S. Appl. No. 13/050,790, filed Mar. 17, 2011, ThyssenKrupp Robins, Inc.

* cited by examiner

*Primary Examiner* — Kavel Singh
(74) *Attorney, Agent, or Firm* — Dorsey & Whitney LLP

(57) ABSTRACT

A angle pipe conveyor comprises a conveyor belt or roller belt. The conveyor belt includes a first conveyor belt section and a second conveyor belt section to define a cylinder structure having an overlap thickness based on plural sections of the roller belt with an overlap structure having an oval-shaped cross section. Support elements support the conveyor belt as rollers located on the support elements guide the cylinder structure.

17 Claims, 6 Drawing Sheets

STEEP ANGLE PIPE CONVEYOR

FIELD OF THE INVENTION

The present invention relates to pipe conveyors and pipe conveyor systems generally and more particularly to a pipe conveyor system in which the pipe transports bulk materials at a steep angle.

BACKGROUND OF THE INVENTION

Pipe conveyors are known that use a belt to convey bulk material between the phases of mining, processing, and storage. Unlike the troughed conveyer the pipe conveyor encloses the bulk material during transport, allowing it to be used to transport the bulk material through areas where spillage and dust are major concerns, or in the case of dangerous or hazardous materials.

Known pipe conveyors transport the material in a circular cross-section formed by overlapping belt edges and using idlers arranged in a hexagonal pattern to form a tubular shape. At the loading point these systems provide a trough conveyor for loading of the material. After loading the material, the belt is formed into a pipe shape for the transport length of the system and re-opened at the destination for the unloading of the material in the standard manner of a troughed conveyor. Because the material is enclosed by the belt during transport, spillage, scattering, and flying dust are eliminated, making the pipe conveyor an effective, non-polluting transport system. These systems also allow the pipe conveyor to maneuver both vertical and horizontal curves that would be very difficult to impossible for the conventional conveyor without loss of conveyed materials. Also, because pipe conveyors load and discharge the bulk material in the conventional manner, standard equipment can be used at the head and tail ends, making the system cost effective and efficient.

Pipe conveyor systems of the state-of-the-art, such as in WO 88/09759; EP 0253148; DE 31 45 899; DE 36 20 906; DE 36 24 122; EP 0194509; U.S. Pat. No. 5,080,221; and U.S. Pat. No. 4,723,653 and others, are limited with regard to the angle of inclination of conveyance. In such known prior systems the pipe conveyors transport the bulk materials at an angle of up to 30° and no higher. With previous designs the maximum filling of the pipe conveyor was considered to be 75% of the entire cross-sectional volume of the pipe. This limitation was present because any filling larger than that would result in an unstable running condition which would send the conveyor belts into either a clockwise or counterclockwise turning motion.

DE 196 17 089 discloses a conveyor that has several successively mounted roller frames arranged so that the cross-section enclosed by the conveyor belt when changing over to the rising section is reduced by 15 to 25% compared with the horizontal section previously covered. The conveyor belt, before beginning of the cross section reduction, may receive an oval cross-sectional shape with horizontal centerline. With this a return of the hose belt conveyor is easier and better controllable in the rising distance section. The reduction in cross-section corresponds to the part of the cross-section not covered by material when the belt is loaded in the horizontal section.

SUMMARY OF THE INVENTION

The present invention relates to an angle pipe conveyor. The angle pipe conveyor comprises a roller belt having a first roller belt edge section and a second roller belt edge section. The first roller belt edge section overlaps with the second roller belt section to define a cylinder structure having an overlap thickness based on plural sections of the roller belt with an overlap cylinder structure having an oval-shaped cross section. An idler panel is provided. The idler panel supports the roller belt. A plurality of idler rollers are attached to the idler panel via springs so that the idler rollers are spring-loaded. The idler rollers guide the roller belt in a transporting direction. The idler rollers compress the overlapping sections of the roller belt to maintain the oval-shaped cross section of the cylinder structure. The oval shape cross section prevents the pipe conveyor from turning clockwise or counterclockwise.

In a preferred embodiment, the cross section of the pipe is loaded to 95% to 100% with fill, such as 98%. The material will be allowed to compact itself to a full cross section whereby the belt enclosing the material becomes rigid and stiff to hold the material in place without opening up between supporting elements. An inclining means including the amount of fill in the cross section, the support elements and the idler rollers is provided in the steep angle conveyor. In a preferred embodiment, a skirtboard of 98% of pipe cross section is provided. The support elements hold the shape of the conveyor belt in place and are spaced at very close spacing. In a preferred embodiment, the distance between each supporting element is approximately 500 mm. Preferably, a short transition distance is provided to enable quick pipe closing. The cylinder structure has a minor diameter and a major diameter. In a preferred embodiment, the minor diameter is less or equal to than the major diameter The angle pipe conveyor further comprises a first roller and a second roller. The roller belt extends along the first roller and the second roller.

The roller belt extends from a loading area and a depositing area. The first roller belt section and the second roller belt section define an opening at the loading area and the depositing area, i.e. the conveyor belt is not enclosed along the circumferential direction and remains open at the loading area and the depositing area.

The cylinder with the overlap structure extends between the loading area and the depositing area.

A portion of the roller belt extends at a steep angle between thirty and ninety degrees with respect to horizontal.

The overlap structure is a multi-layer design. The multi-layer design advantageously provides rigidity and stiffness to the overlap structure.

The angle pipe conveyor comprises a first support element and a second support element. The first support element is closely spaced from the second support element to form a closely spaced arrangement of support elements. A plurality of spring loaded upper roller elements are arranged on the first support element and the second support element. A plurality of lower roller elements are arranged on the first support element and the second support element. A conveyor belt has a loading section, a transporting section and a depositing section. The conveyor belt has a first conveyor belt section and a second conveyor belt section. The first conveyor belt section overlaps with the second conveyor belt section in the transporting section to define a cylinder having an overlap length based on plural sections of the conveyor belt, whereby diameter length of the first conveyor belt section overlaps a diameter length of the second conveyor belt section. The cylinder structure has an oval-shaped cross section. The upper roller elements guide the cylinder structure along the transporting section in a transporting direction. The lower roller elements guide the cylinder structure in a return direction. The first conveyor belt section and the second conveyor belt section define an opening in the circumferential direction such that the conveyor belt is open at the loading section and the depositing section.

In a preferred embodiment, the first conveyor belt edge section has a large overlap with the second conveyor belt edge section. This provides a positive material seal so that no material escapes during transport. The conveyor belt section edges provide a full diameter length for a better material seal. In a preferred embodiment, the belt overlap is twice as long as in known pipe conveyor designs.

The transporting section continuously extends between the loading section and the depositing section.

The angle pipe conveyor further comprises a motor for driving the conveyor belt.

The angle pipe conveyor further comprises a chute for depositing material on the loading section of the conveyor belt. A first support structure supports a loading section of the conveyor belt. A second support structure supports the depositing section of the conveyor belt. A third support structure supports the support elements of the transporting section of the conveyor belt.

The angle pipe conveyor comprises a plurality of support elements. One support element is arranged adjacent another support element. A plurality of rollers are arranged on each support element. The plurality of rollers define a first opening in each support element. A roller belt has a first roller belt section and a second roller belt section. The first roller belt section overlaps the second roller belt section to define a cylinder structure having an overlap thickness based on plural sections of the roller belt. The first roller belt section overlaps the second roller belt section almost ninety degrees or more in a circumferential direction. The plurality of rollers guide the cylinder structure through the first opening in a transporting direction. The plurality of rollers contact the roller belt such that the cylinder structure maintains an oval-shaped cross section.

The angle pipe conveyor further comprises another plurality of rollers arranged on each support element. The second plurality of rollers define a second opening in each support element. The roller belt is guided from the first roller to the second roller via the plurality of rollers and another plurality of rollers.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

FIG. 1b is another perspective view of the end of the angle pipe conveyor of FIG. 1a;

DESCRIPTION OF THE PREFERRED EMBODIMENT

Figure 1A:
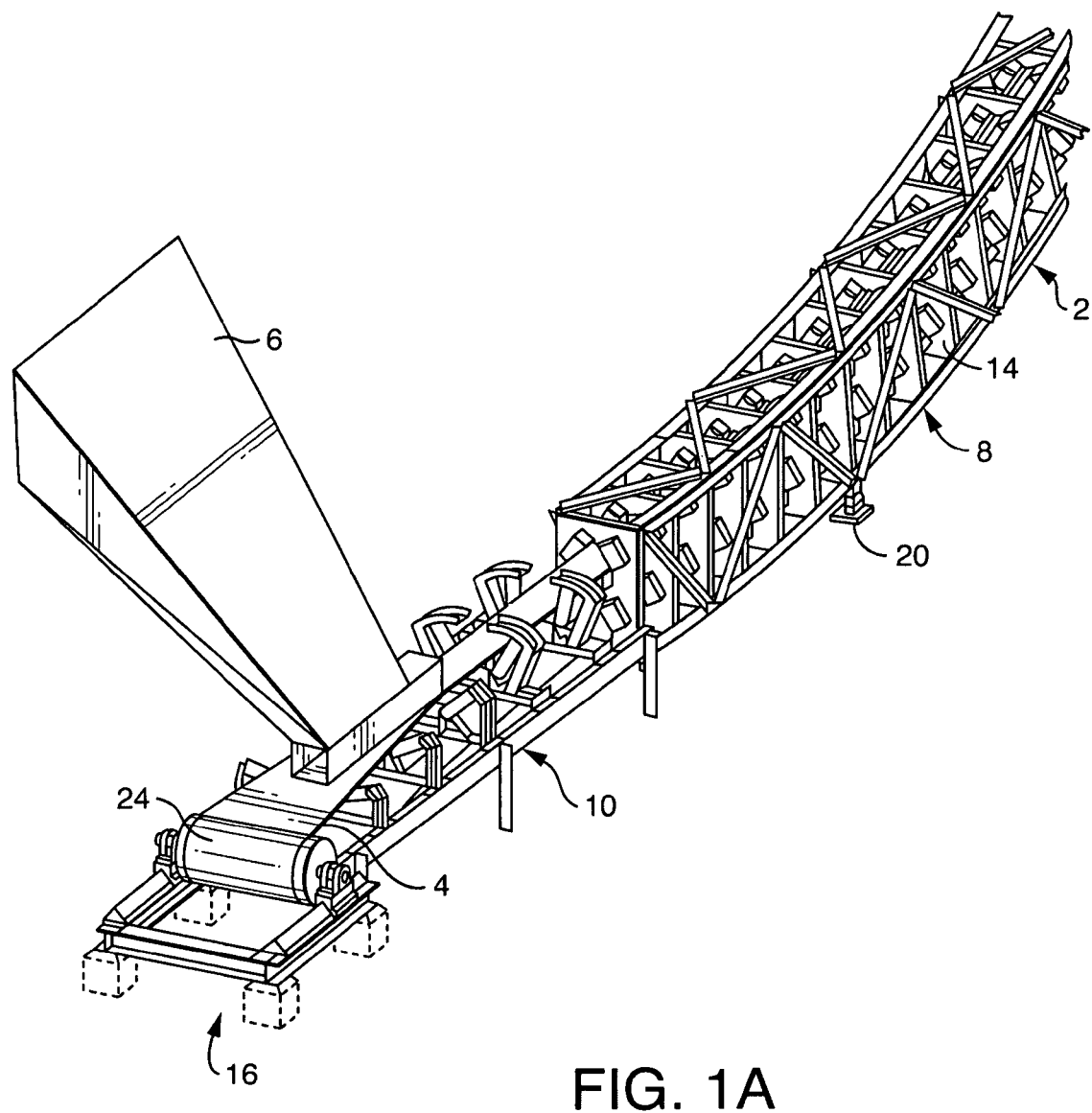
FIG. 1a is a perspective view of an end of the angle pipe conveyor.
Figure 1B:
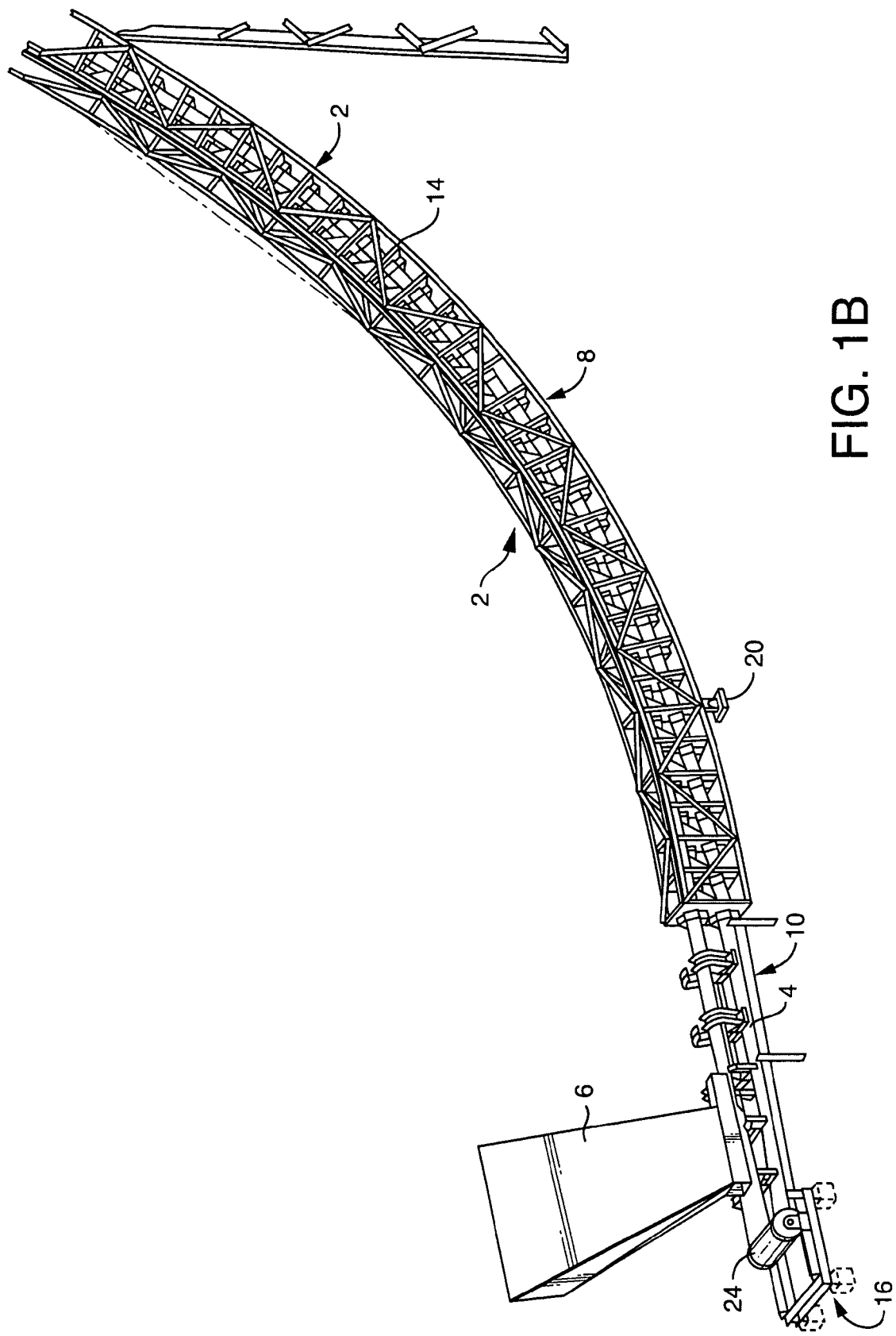
Figure 2A:
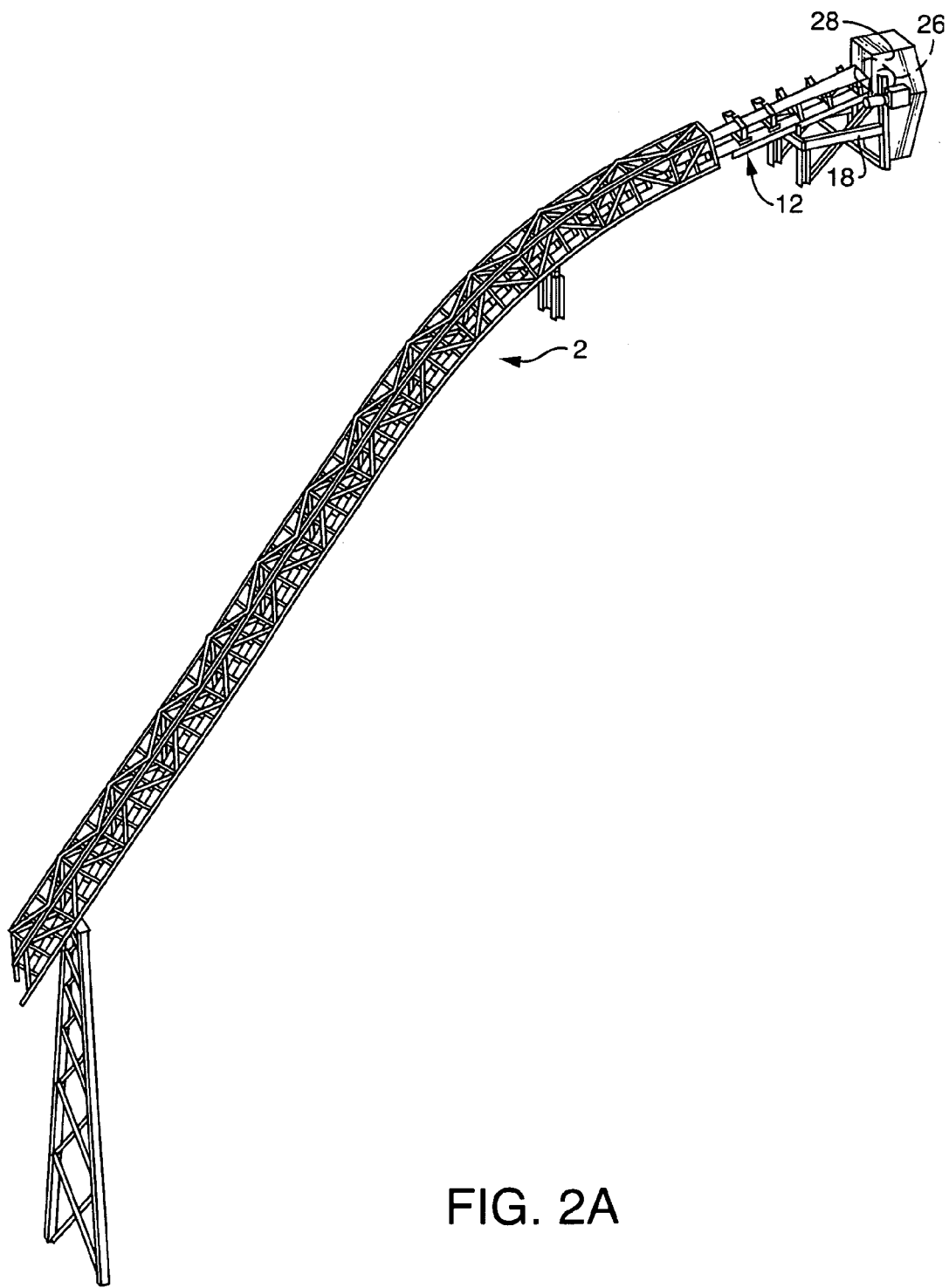
FIG. 2a is a perspective view of the opposite end of the angle pipe conveyor.

Referring to the drawings in particular, FIG. 1a and FIG. 1b show perspective views of the same end of the angle pipe conveyor 2. The angle pipe conveyor 2 comprises a conveyor belt or roller belt 4. Material is loaded on to the conveyor belt 4 via a chute or loading means 6. The conveyor belt 4 has a transporting section 8, a loading section 10 and a depositing section 12 (FIG. 2a). A plurality of support elements or idler panels 14 support the conveyor belt 4. The angle pipe conveyor 2 extends at an angle from thirty degrees to ninety degrees with respect to horizontal. Each support element 14 is closely spaced to another support element to provide a close arrangement of support elements. A first support structure 16 supports the loading section 10 of the conveyor belt 4. Second support structure 20 supports the transporting section 8 of the conveyor belt 4.

Figure 2B:
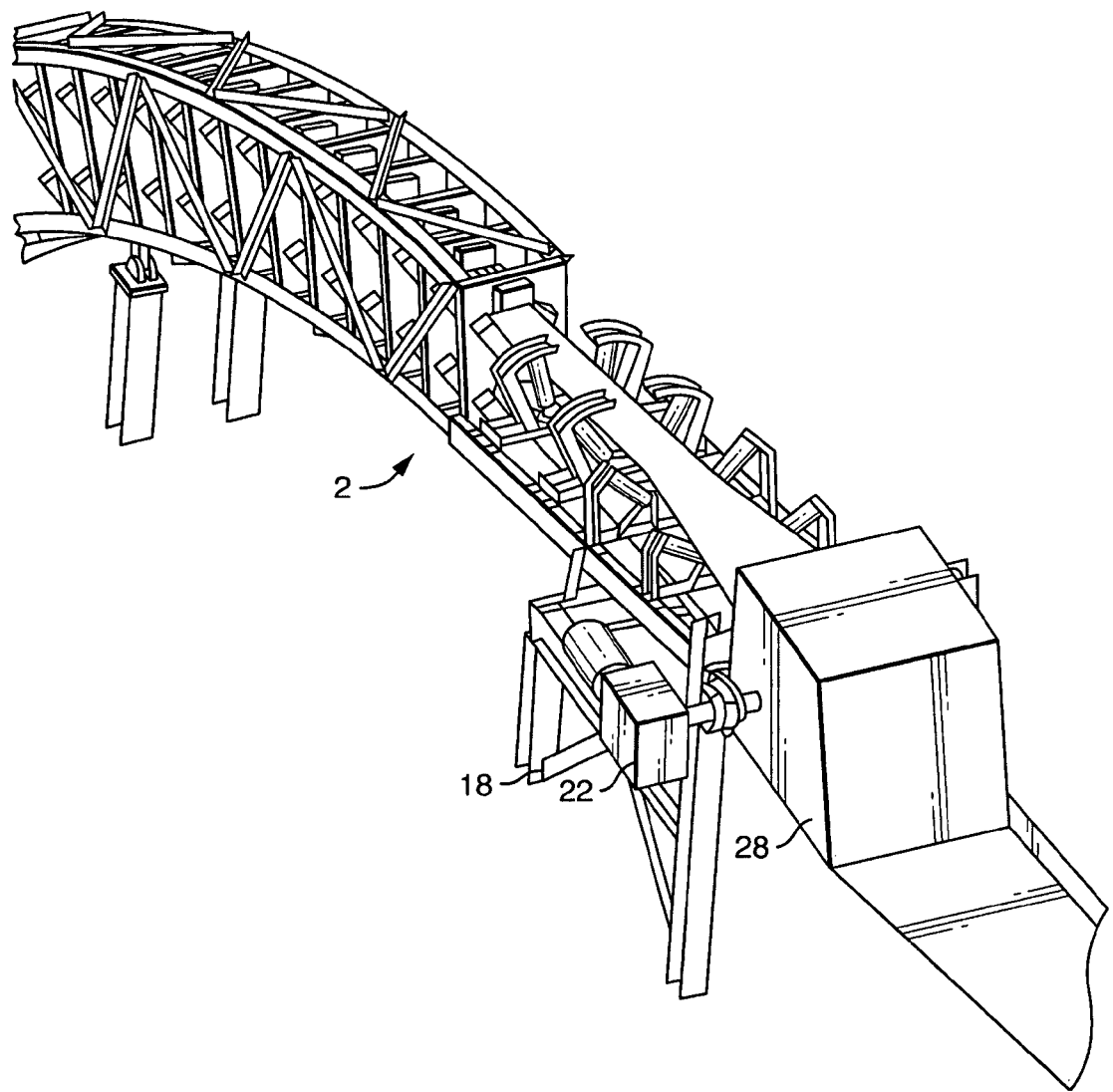
FIG. 2b is another perspective view of the opposite end of the angle pipe conveyor.

FIGS. 2a and 2b show perspective views of the other end of the angle pipe conveyor 2. The conveyor belt 4 extends from a first roller 24 (FIG. 1a) to a second roller 26. A motor 22 drives the rollers 24, 26. The conveyor belt deposits material into a receiving means 28 for further transport of the material. The depositing section 12 of the conveyor belt 4 is supported by a third support structure 18.

Figure 3:
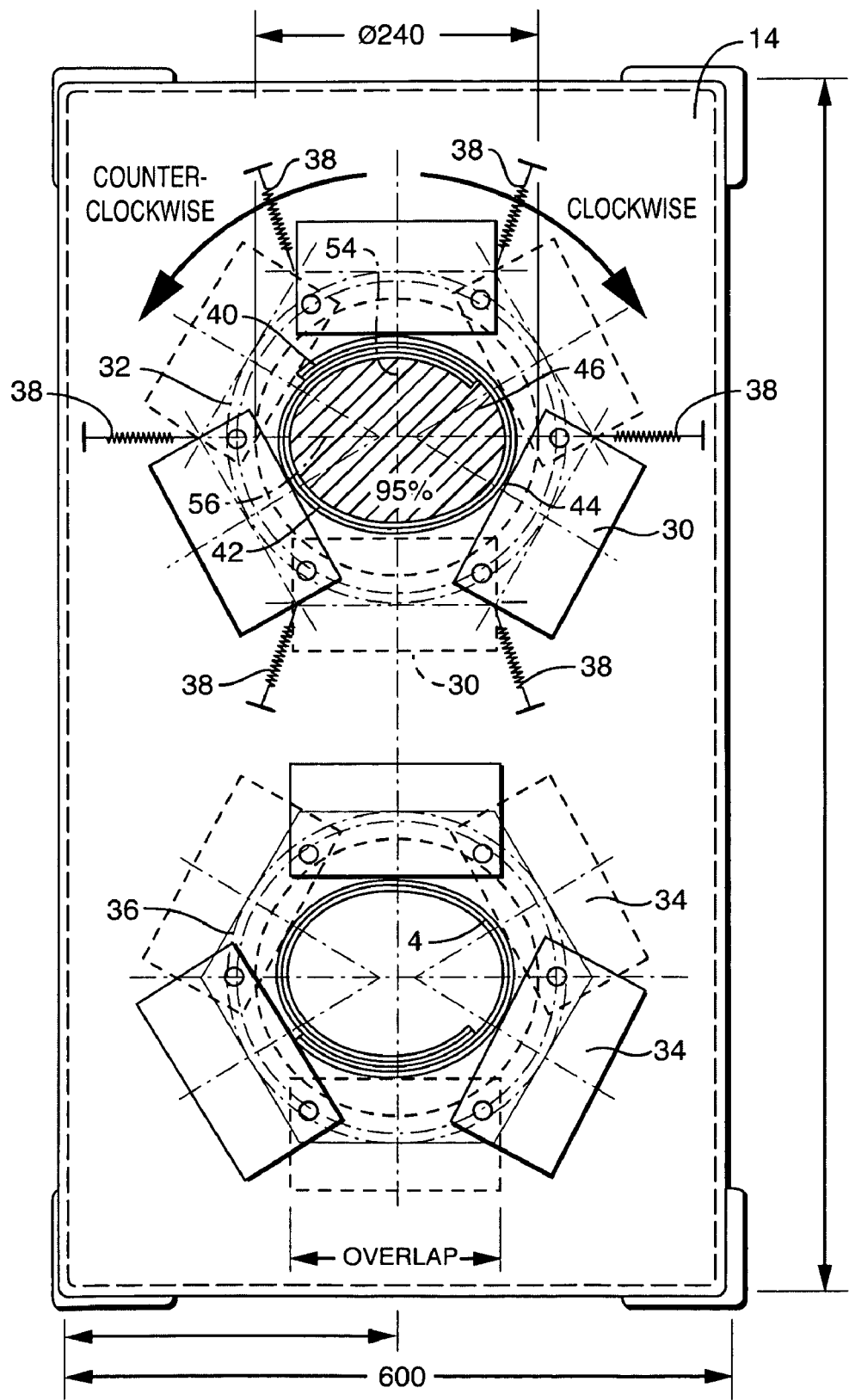
FIG. 3 is a front view of a support element of the angle pipe conveyor.
Figure 4:
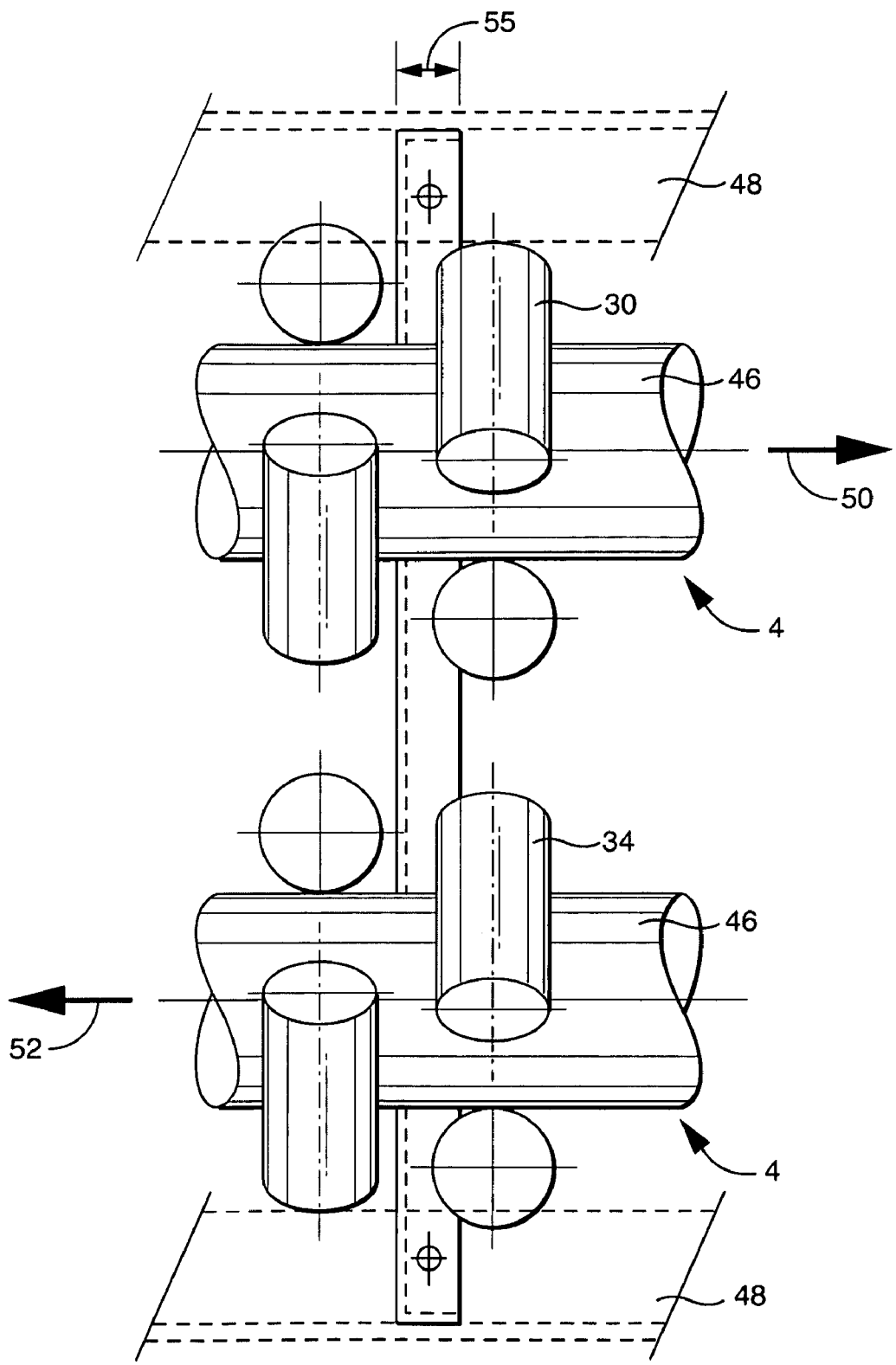
FIG. 4 is a side view of the support element of the angle pipe conveyor.

FIG. 3 shows a front view of one of the support elements 14 that supports the conveyor belt 4. Upper rollers or idle rollers 30 are positioned around a first opening 32 in the support element 14. Lower rollers 34 surround a second opening 36 in the support element 14. The upper rollers 30 are connected to the support elements 14 via springs 38. The conveyor belt 4 has a first conveyor belt section 40 and a second conveyor belt section 42. The first conveyor belt section 40 overlaps the second conveyor belt section 42 to define a cylinder structure 46 having an overlap thickness based on plural sections of the conveyor belt 4. This provides an overlap cylinder structure 44 having an oval-shaped cross section. The cylinder structure 44 is of a multi-layer design, which advantageously provides strength, stiffness and rigidity to the cylinder structure 44. The first conveyor belt section 40 overlaps the second conveyor belt section 42 by almost ninety degrees or more in a circumferential direction. The length of the diameter of the first conveyor belt edge section 40 overlaps the length of the diameter of the second conveyor belt edge section 42. The upper rollers 30 are positioned around the first opening 32 such that the upper rollers 30 contact the cylinder structure 46 to maintain the oval-shaped cross section. The upper rollers 30 and lower rollers FIG. 4 shows a side view of one of the support elements 14 that supports the conveyor belt 4. The support element is mounted to supports 48. FIG. 4 further shows the positions of upper rollers 30 and lower rollers 34 in relation to the conveyor belt 4, which is in the form of cylinder structure 46. The upper rollers 30 guide the conveyor belt 4 in a transporting direction 50. The lower rollers 34 guide the conveyor belt 4 in a direction 52 opposite the transporting direction.

While a specific embodiment of the invention has been shown and described in detail to illustrate the application of the principles of the invention, it will be understood that the invention may be embodied otherwise without departing from such principles.

APPENDIX

List of Reference Numbers

2—Angle pipe conveyor
4—Conveyor or roller belt
6—Chute or loading means
8—Transporting section of conveyor belt
10—Loading section of conveyor belt
12—Depositing section of conveyor belt 14—Support element or idler panel
16—First support structure
18—Third support structure
20—Second support structure
22—Motor
24—First roller
26—Second roller
28—Receiving means
30—Upper rollers
32—First opening in support element
34—Lower rollers
36—Second opening in support element
38—Spring
40—First conveyor belt section
42—Second conveyor belt section
44—Overlap structure
46—Cylinder structure
48—Supports
50—Transport direction
52—Direction opposite transport direction
54—Minor diameter
56—Major diameter

What is claimed is:

1. A system comprising:
    a roller belt extending from a loading area to a depositing area;
    the roller belt including a lengthwise portion between the loading area and the depositing area that inclines at an angle between approximately thirty and ninety degrees with respect to horizontal;
    at least at said inclined lengthwise portion of said roller belt, said roller belt including a first roller belt section overlapping a second roller belt section to define an oval-shaped cross section that contains an amount of fill that occupies at least 95% of said oval-shaped cross section;
    a plurality of support elements positioned proximate said roller belt along the inclined lengthwise portion of said roller belt where a distance, as measured along the length of said roller belt, between adjacent support elements of said plurality of support elements is no greater than approximately 500 millimeters; and
    each support element of said plurality of support elements includes a plurality of spring-loaded rollers attached thereto, said spring-loaded rollers guiding said roller belt in a transporting direction and compressing said overlapping sections of said roller belt to maintain said oval-shaped cross section of said roller belt.

2. A system in accordance with claim 1, further comprising:
    a first roller positioned within the loading area; and
    a second roller positioned within the depositing area.

3. A system in accordance with claim 1, wherein said first roller belt section and said second roller belt section define an opening at said loading area and said depositing area.

4. A system in accordance with claim 1, wherein said oval-shaped cross section includes a minor diameter and a major diameter, said minor diameter being less than said major diameter.

5. A system in accordance with claim 1, wherein said roller belt comprises a multi-layer design, said multi-layer design providing rigidity and stiffness to said roller belt along said inclined lengthwise portion.

6. A system in accordance with claim 1, further comprising:
    each of said support elements further supporting a plurality of lower roller elements;
    said roller belt including a loading section, a transporting section and a depositing section, said lower roller elements guiding said roller belt in a return direction, and said first roller belt section and said second roller belt section defining an opening such that said roller belt is open at said loading section and said depositing section.

7. A system in accordance with claim 6, wherein said roller belt comprises a multi-layer design, and said multi-layer design provides rigidity and stiffness to said roller belt along said inclined lengthwise portion.

8. A system in accordance with claim 6, further comprising:
    a first roller;
    a second roller; and
    said roller belt extending from said first roller to said second roller.

9. A system in accordance with claim 6, further comprising a motor for driving said roller belt.

10. A system in accordance with claim 6 further comprising:
    a chute for depositing material on said loading section of said roller belt;
    a first support structure supporting said loading section of said roller belt;
    a second support structure supporting said depositing section of said roller belt; and
    a third support structure supporting said support elements.

11. A system in accordance with claim 1, further comprising:
    said plurality of spring-loaded rollers positioned proximate a first opening defined by their respective support element; and
    said first roller belt section overlaps said second roller belt section at least ninety degrees in a circumferential direction.

12. A system in accordance with claim 11, further comprising:
    a first roller;
    a plurality of rollers arranged on each said support element, said plurality of rollers positioned proximate a second opening defined by their respective support element; and
    a second roller, said roller belt guided from said first roller to said second roller via said plurality of spring-loaded rollers and from said second roller to said first roller via said plurality of rollers.

13. A system in accordance with claim 11, wherein said roller belt includes a loading section and a depositing section, and said first roller belt section and said second roller belt section define an opening in a circumferential direction at said loading section and said depositing section.

14. A system in accordance with claim 13, wherein said oval-shaped cross section extends between said loading section and said depositing section to define a transporting section of said roller belt.

15. A system in accordance with claim 11, further comprising a motor for driving said roller belt.

16. A system in accordance with claim 11, wherein said roller belt includes a multi-layer design, and said multi-layer design provides stiffness and rigidity to said roller belt along said inclined lengthwise portion.

17. The system of claim 1, wherein the loading area is located at a first elevation, and the depositing area is located an elevation greater than the first elevation.

* * * * *